United States Patent
Gieszl

[11] 3,814,203
[45] June 4, 1974

[54] STEERING SYSTEM
[76] Inventor: Carl R. Gieszl, 1097 Muir Way, Los Altos, Calif. 94022
[22] Filed: Jan. 22, 1973
[21] Appl. No.: 325,755

[52] U.S. Cl........... 180/79.2 R, 91/374, 180/79.2 C
[51] Int. Cl.............................................. B62d 5/08
[58] Field of Search..... 180/79.2 R, 79.2 B, 79.2 C; 91/374, 375

[56] References Cited
UNITED STATES PATENTS
| | | | |
|---|---|---|---|
| 1,657,412 | 1/1928 | Schneider | 180/79.2 R |
| 3,170,535 | 2/1965 | Barton et al. | 180/79.2 R |
| 3,357,316 | 12/1967 | Brown | 91/375 |

Primary Examiner—David Schonberg
Assistant Examiner—John A. Pekar
Attorney, Agent, or Firm—I. Robert Mednick

[57] ABSTRACT

The steering system for each pair of steerable wheels in a motor vehicle includes a control valve to hydraulically connect a pressure fluid source to a steering linkage actuator for the pair of steerable wheels in the motor vehicle. A steering shaft with a laterally extending arm is provided to operate the control valve. The steering shaft extends into a rotatable housing member on which the control valve is mounted to move therewith. Coupling means is provided to connect the housing member to the steering linkage in order to turn and align the housing member around the steering shaft to correspond with the turning of the pair of road wheels. The steering shaft is urged by spring means to a position to close the control valve. A driver can operate a turning member to turn the steering shaft with respect to the housing member against the force of the spring means in order to steer the motor vehicle. Locking means is also provided to enable the pair of road wheels to be held in a fixed direction. For four wheels steering, two turning members can be closely positioned to enable a driver to determine and control the turned direction of each pair of road wheels by the use of one hand.

26 Claims, 11 Drawing Figures

STEERING SYSTEM

The present invention relates to a steering system for a motor vehicle, and more particularly relates to a steering system for a motor vehicle in which the turned direction of its road wheels can be determined and controlled by the driver of the motor vehicle during its operation.

Motor vehicles such automobiles generally have front wheels steering in which its two front wheels are caused to turn in order to steer the automobile. In steering a motor vehicle with two steerable front road wheels, a steering linkage is generally used to simultaneously pivot or turn both road wheels about king pins or the like. Such a steering linkage includes a steering arm connected to turn each wheel, and a so-called tie rod interconnecting both steering arms.

The tie rod of the steering linkage can be moved by means of a gear device to convert the rotary motion of a steering shaft to a corresponding translational movement of the tie rod. In power steering, usually hydraulic pressure developed by an engine operated pump is selectively directed by a control valve to a piston operated actuator connected to move the tie rod of the steering linkage. Because of the reduced effort required, power steering is generally preferred. In either case, a driver can steer such a motor vehicle by rotating a steering wheel inside the motor vehicle to turn the steering shaft, which will move the tie rod of the steering linkage to cause both of the front road wheels to turn.

For a motor vehicle with a steering system as described, a driver can observe the direction in which the motor vehicle is steered while it is moving. The driver, being inside the motor vehicle, will not ordinarily be able to see the direction in which the road wheels are turned. However, because of his experience in driving a motor vehicle with two steerable front road wheels, the driver can suitably change the direction of steering. In such a motor vehicle, it is not necessary for the driver to be able to know the direction in which the front road wheels are turned.

In specialized motor vehicles such as fork lifts, towing tugs, and trailer-connected vehicles, it is at times desirable to provide steering means to enable a greater maneuverability of the motor vehicle than that provided by front wheel steering alone. In operating such specialized vehicles, it may be desirable to make sharp turns or abrupt changes in direction in restricted areas. For these purposes, four wheels steering has been utilized. Such four wheel steering enables both the front pair of road wheels and the back pair of road wheels to be independently turned by steering means such as previously described.

For such four wheel steering, it will be realized that when both pairs of wheels have already been turned, there are several possible ways of thereafter changing the direction of turning. In a motor vehicle having four wheel steering, as the driver will not ordinarily be able to see the road wheels, he will not know how they are turned. Consequently, the driver is likely to be confused as to how to turn either the front pair of wheels, the rear pair of wheels, or both in order to change the steering of the motor vehicle. It is therefore desirable that the driver be able to have means for knowing and controlling the turned direction of each pair of road wheels. Further, the driver should preferably be able to determine and to control the turned direction of the road wheels in a manner so that he can simultaneously give adequate attention to other factors in accomplishing the particular work involved. If able to do so, then by experience the driver can efficiently and quickly maneuver the motor vehicle as desired.

The present invention relates to a power operated steering system for a motor vehicle having steerable road wheels pivoted or turned by steering linkage. For each pair of steerable road wheels, this steering system includes a control means to connect a steering power source to its actuator, and includes a steering shaft with a laterally extending arm to operate the control means. Spring means is provided to urge the steering shaft to a position to close the control means. A rotatable housing member surrounds the steering shaft, and the housing member is rotatively supported on a mount support. The control means is mounted on said housing member to move therewith. Couplmeans is provided to turn and align the housing member around the steering shaft to correspond with the turning of the road wheels. Locking means is also provided to enable the pair of road wheels to be held in a fixed direction. When operating a steering system of this invention, a driver of the motor vehicle can easily and readily determine and control the turned direction of the motor vehicle having one or two pairs of steerable road wheels.

It is therefore an object of this invention to provide a novel steering system for a motor vehicle.

Another object of this invention is to provide a steering system that may be utilized with existing motor vehicles of various types.

An additional object of this invention is to provide a steering system which can be utilized for direct control of hydraulic steering power, hydraulically amplified control of hydraulic steering power, electrical control of hydraulic steering power, or electrical control of electrical steering power.

Still another object of this invention is to provide a steering system in which a manually operated lever can be used to control the direction of turning of a pair of wheels, and wherein the direction of said lever can be aligned to indicate the turned direction of the pair of wheels.

A further object of this invention is to provide a steering system that can be used in motor vehicles having two pairs of steerable wheels, wherein each pair of wheels can be independently turned in the same or in the opposite direction of the other pair of wheels to enable the motor vehicle to be readily turned in any desired direction.

A still further object of this invention is to provide a steering system for a motor vehicle having two independently operated pairs of steerable road wheels, said steering system being controlled by two closely positioned levers so that an operator using one hand can turn both pairs of steerable wheels and know and control the turned direction of both pairs of wheels.

Still another object of this invention is to provide a steering system for a motor vehicle which is made of readily available or easily manufactured parts of relatively simple design, so that the steering system is economical to manufacture and can be quickly and easily installed in motor vehicles.

The novel features which are believed to be characteristic of the invention, both as to its organization and method of operation, together with further objects and advantages thereof, will be better understood from the following description of a directly controlled hydraulically powered system considered in connection with the accompanying drawings in which an embodiment of the invention is illustrated by way of example. It is to be expressly understood, however, that the drawings are for the purpose of illustration and description only and are not intended as a definition of the limits of the present invention.

Figure 1:
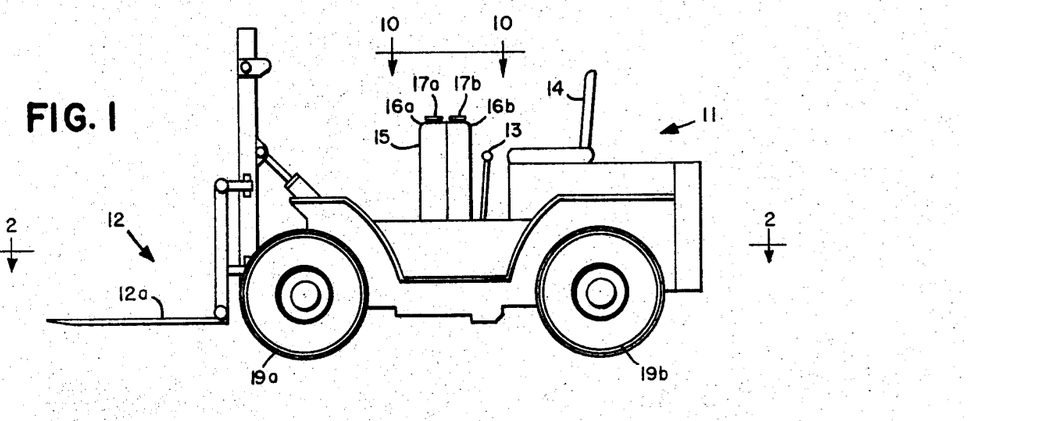
FIG. 1 is a side view of a motor vehicle having a steering system embodying a preferred form of this invention.
Figure 2:
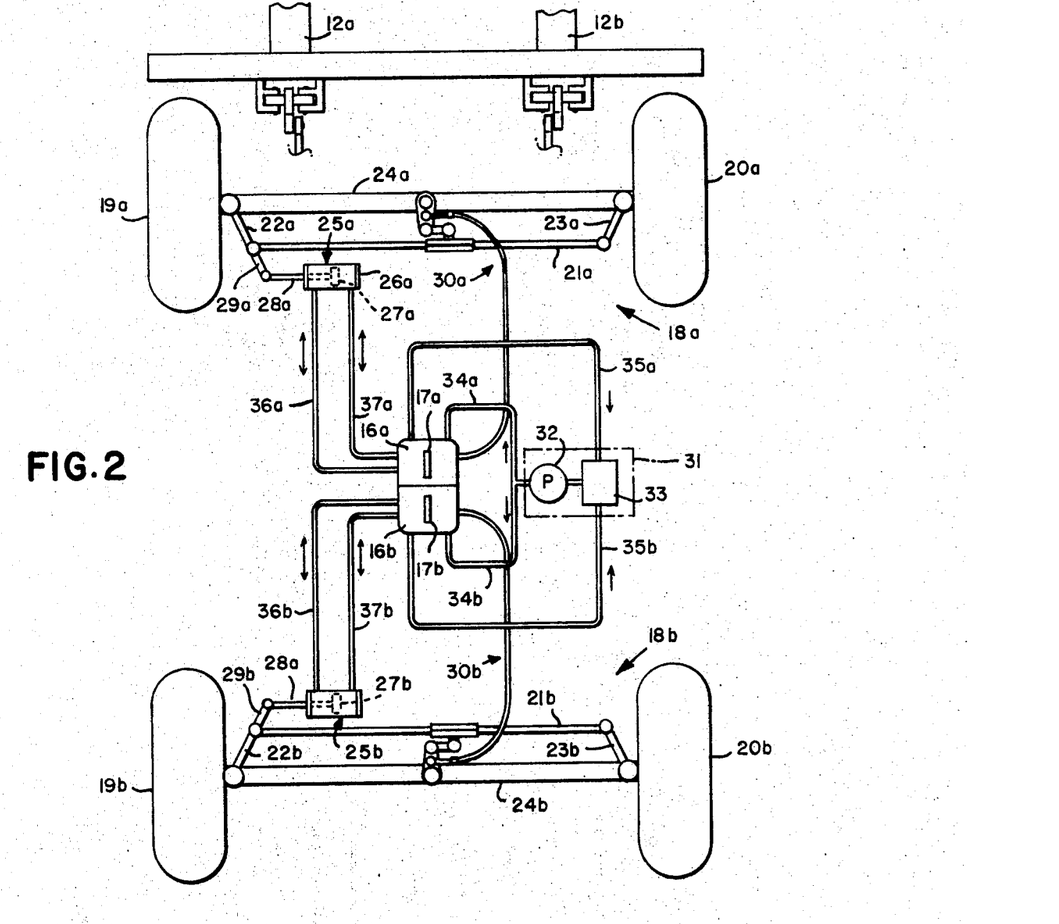
FIG. 2 is a partial top view of the motor vehicle as seen along lines 2—2 of FIG. 1 showing a schematic representation of an hydraulic arrangement of the steering system of this invention.

Referring now to the figures, FIG. 1 is a side view of a fork lift motor vehicle with a steering system of this invention, and FIG. 2 is a partial top view of the motor vehicle as seen along lines 2—2 of FIG. 1 showing a schematic representation of an hydraulic arrangement of the steering system of this invention. This motor vehicle includes a body 11 mounted on a frame with a fork lift mechanism 12 having fork lift arms 12a and 12b in the front thereof. A gear shift rod 13 is shown near a driver's seat 14 with a steering console 15 in front thereof. A front steering unit 16a and a rear steering unit 16b is provided to enable a driver in driver's seat 14 to control the steering of the motor vehicle by using the fingers of one hand to turn closely positioned levers 17a and 17b, being the turning members herein, which extend above console 15. As seen in FIG. 2, a steering linkage generally designated by numeral 18a is connected to front pair of road wheels 19a and 20a, and a steering linkage generally designated by numeral 18b is connected to a rear pair of road wheels 19b and 20b. Steering linkage 18a includes a tie rod 21a and a pair of steering arms 22a and 23a respectively connected at the ends of tie rod 21a. The other ends of steering arms 22a and 23a connect to a transverse member 24a fixedly connected to the frame of the motor vehicle, said transverse member 24a may be an axle for road wheels 19a and 20a. Steering linkage 18b for road wheels 19b and 20b includes a tie rod 21b, and steering arms 22b and 23b connected to transverse member 24b in the same manner as that indicated for steering linkage 18a. An actuator 25a for steering linkage 18a has a cylinder housing 26a pivotally attached to the frame of the motor vehicle. A piston 27a is located inside cylinder housing 26a. A piston rod 28a is connected to piston 27a and extends from en end of cylinder housing 26a to connect to extension section 29a of steering arm 22a. Another piston actuator 25b for steering linkage 18b has a cylinder housing 26b, a piston 27b, and a piston rod 28b similarly connected as indicated for piston actuator 28a. Coupling means generally designated as 30a connects from transverse member 24a and tie rod 21a of steering linkage 18a to steering unit 16a. Coupling means generally designated as 30b connects from transverse member 24b and tie rod 21b of steering linkage 18b to steering unit 16b.

The steering power source shown herein is a pressure fluid source 31 which includes a conventional hydraulic pump 32 and a reservoir 33 of suitable hydraulic fluid. Pump 32 may be driven by a belt from the engine crankshaft pulley. Pump 32 obtains fluid from reservoir 33 and delivers the fluid under suitable high pressure to a flexible hose 34a leading to steering unit 16a and to another flexible hose 34b leading to steering unit 16b. A return hose 35a returns fluid at low pressure from steering unit 16a to container 33, and another return hose 35b returns fluid at low pressure from steering unit 16b to container 33. From steering unit 16a, a conduit 37a connects to actuator 25a to the region above piston 27a in cylinder housing 26a by means of a suitable port therein, and conduit 36a connects to actuator 25a to the region below piston 27a in cylinder housing 26a by means of a suitable port therein. Similarly, from steering unit 16b, conduits 37b and 36b respectively connect to the regions above and below piston 27b in cylinder housing 26b of actuator 25b.

The steering system of this invention for the described fork lift motor vehicle with two pair of steerable wheels includes a steering system for front road wheels 19a and 20a and another steering system for rear road wheels 19b and 20b. Front road wheels 19a and 20a are pivoted by steering linkage 18a which is moved by actuator 25a. Front steering unit 16a receives fluid under high pressure from pump 32 of pressure fluid source 31 to operate actuator 25a when lever 17a is manually turned. Coupling means 30a transmits the motion of tie rod 21a to front steering unit 16a in a manner hereinafter described which results in lever 17a being aligned with the turned direction of front road wheels 19a and 20a. Rear road wheels 19b and 20b are pivoted by another identical steering system. Rear road wheels 19b and 20b, steering linkage 18b, actuator 25b, lever 17b, and coupling means 30b are separately but similarly connected, and are independently but similarly operated. Accordingly, although the hereinafter detailed description will refer to the steering system for the front road wheels, it will also be applicable to the identical steering system for the rear road wheels.

Figures 3, 4, 5:
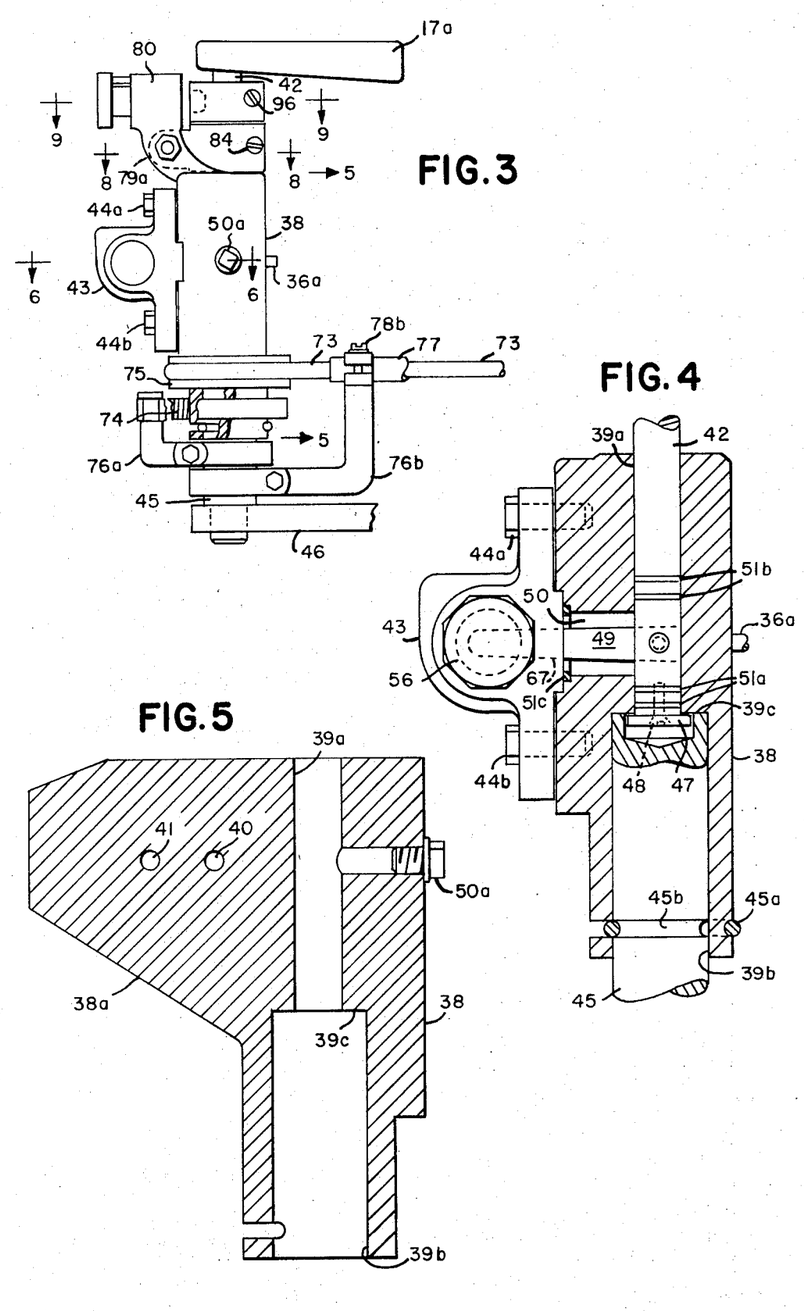
FIG. 3 is an enlarged view of the front steering unit as seen in FIG. 1 with the console removed.
FIG. 4 is an enlarged partial view of the front steering unit seen in FIG. 3 in which the housing member thereof is shown in cross-section.
FIG. 5 is an enlarged cross-sectional view of the housing member of the front steering unit as seen along lines 5—5 of FIG. 3.

FIG. 3 shows an enlarged view of the hydraulic front steering unit 16a as seen in FIG. 1 with console 15 removed. In addition, FIG. 4 shows a cross-sectional view of the housing member of the steering unit 16a of FIG. 3, and FIG. 5 shows still another cross-sectional view of the housing member of the steering unit 16a as seen along lines 5—5 of FIG. 3. Steering unit 16a includes a housing member 38 having an upper longitudinal bore 39a, a lower enlarged longitudinal bore 39b, and two transverse passageways 40 and 41. A steering shaft 42 is fitted in bore 39a to be surrounded and supported by housing member 38. The control means of the illustrated embodiment is seen to be a control valve 43 that is fixedly mounted on housing member 38 to rotate therewith by means of screw bolts 44a and 44b. Housing member 38 has a laterally extending upper portion 38a to accommodate control valve 43 and to enable it to be operably mounted thereon. The turning member for steering unit 16 a is lever 17a fixedly secured to the upper end of steering shaft 42 extending above housing member 38 and above console 15. A cylindrically shaped mount support 45 has its lower end fixedly secured to a base plate 46 which in turn is fixedly secured to the frame of the motor vehicle. Base plate 46 similarly supports an identical mount support in rear steering unit 16b. Mount support 45 extends upward into lower bore 39b of housing member 38. A ring shaped member 47 is seen next to annular shoulder 39c formed inside housing member 38. Ring shaped member 47 is attached to the bottom of steering shaft 42 by screw 48. A spring wire snapping keeper 45a about housing member 38 is retained inside a circumferential semicurcular groove 45b formed in mount support in order to retain housing member 38 with respect to mount support 45. A control arm 49 with one end fixedly attached to steering shaft 42 extends through a lateral opening 50 in housing memer 38 into control valve 43. Steering shaft 42 is fitted inside bore 39a of housing member 38 to rotate therein. A pair of sealing O-rings 51a are fitted on steering shaft 42 below opening 50, and another pair of sealing O-rings 51b are fitted on steering shaft 42 above opening 50 to provide a fluid seal while allowing relative rotational movement between steering shaft 42 and housing member 38. A sealing O-ring 51c provides a fluid seal between housing member 38 and control valve 43. Threaded plug 50a closes an access opening in housing member 38 for attaching control arm 49 to steering shaft 42.

Control valve 43 is provided to selectively direct the flow of high pressure fluid from pump 32 to actuator 25a and also to return low pressure fluid to container or fluid reservoir 33. As seen more clearly by the cross-sectional view of FIG. 6, control valve 43 includes a valve casing 52 forming a cylindrical chamber 53 with two annular recesses 54 and 55. A plug member 56 is seen threadably engaged in the end of valve casing 52. Control valve 43 connects by screw fitting 57 to flexible hose 34a to receive fluid under high pressure from pump 32, and connects by screw fitting 58 to flexible hose 35a to return fluid at low pressure to fluid reservoir 33. A valve spool 59 is fitted to slide inside chamber 53 of control valve 43. Valve spool 59 is seen to have two spaced circumferential recesses 60 and 61 forming valve lands 62 and 63 seen to be situated to cover annular recesses 54 and 55 inside valve casing 52. An inlet port 64a extends from fitting 57 through valve casing 52 into circumferential recess 61 in valve spool 59 to admit fluid under high pressure from pump 32. An outlet port 64b extends from fitting 58 through valve casing 52 into the right end of chamber 53 to allow fluid to be returned to fluid reservoir 33. A transverse passageway 65 in valve casing 52 hydraulically connects outlet port 64b with the circumferential recess 60 in valve spool 59. Passageway 65 further connects the left end of chamber 53 to outlet port 64b. A connecting passageway 66a extends through casing 52 into annular recess 54 in valve casing 52. Another connecting passageway 66b extends through valve casing 52 into annular recess 55 in valve casing 52. Control valve 43 is positioned on housing member 38 so that connecting passageway 66a in control valve 43 communicates with transverse passageway 40 in housing member 38, and that connecting passageway 66b in control valve 43 communicates with transverse passageway 41 in housing member 38. Further, an opening 67 extends through valve casing 52 into pocket 68 formed in the left end portion 69 of valve spool 59. Passageway 65a connects pocket 68 to the left end of chamber 53.

Figure 6:
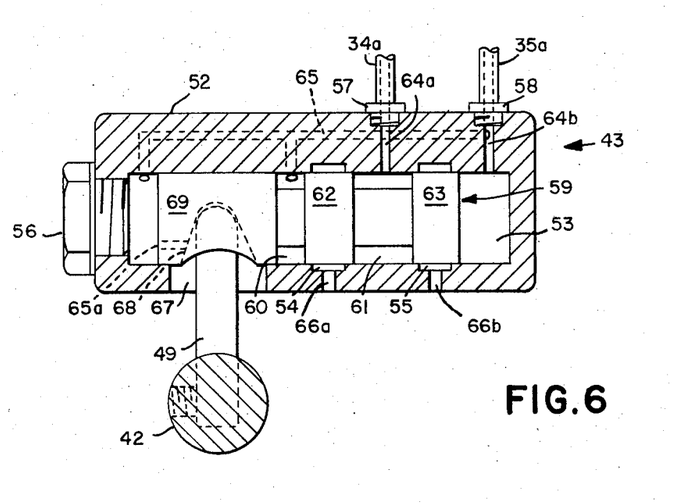
FIG. 6 is an enlarged cross-sectional view of the control valve of the steering system of this invention as seen along lines 6—6 of FIG. 3.

Control arm 49 extends from steering shaft 42 through lateral opening 50 in housing member 38 and through opening 67 in control valve 43 into pocket 68 in end portion 69 of valve spool 59. If steering shaft 42 is aligned with housing member 38 so that valve lands 62 and 63 in valve spool 59 covers annular recesses 54 and 55 in valve casing 52 (as shown in FIG. 6), then fluid under high pressure cannot flow from circumferential recess 61 into connecting passageways 66a or 66b. In that event, valve spool or movable member 59 will be positioned to close the hydraulic connection between pump 32 and actuator 25a.

On the other hand, if steering shaft 42 is turned one way or the other with respect to housing member 38, then movable member 59 will be moved to connect circumferential recess 61 with either connecting passageways 66a or 66b. When steering shaft 42 is turned clockwise, the end of control arm 49 in pocket 68 will move valve spool 59 to the right as seen in FIG. 6, then fluid under high pressure in circumferential recess 61 will pass through connecting passageway 66b in control valve 43 into transverse passageway 41 in housing member 38. When steering shaft 42 is turned counter-clockwise, the end of control arm 49 in pocket 68 will move valve spool 59 to the left as seen in FIG. 6, then fluid under high pressure in circumferential recess 61 will pass through connecting passageway 66a in control valve 43 into transverse passageway 40 in housing member 38. Accordingly, movable member 59 is selectively positionable to operate control valve 43 to hydraulically connect pump 32 with actuator 25a.

Figure 7:
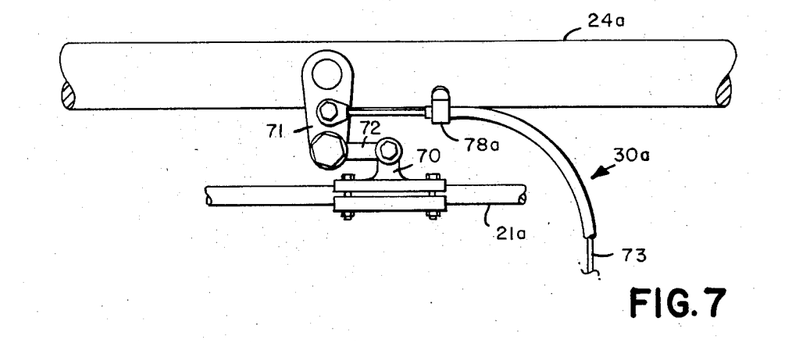
FIG. 7 is an enlarged view of a portion of the coupling means connected to the steering linkage seen in FIG. 2.

The coupling means herein includes a clamp member 70, a feed back arm 71, a drag link 72, and a sheathed cable 73 as seen in FIG. 7. The coupling means also includes a spring member 74 and a pulley 75 seen in FIG. 3. Referring now to FIG. 3, pulley 75 is seen to be fixedly secured around the lower circular portion of housing member 38. Pulley 75 has a grooved rim in which the upper end of cable 73 is secured. An L-shaped bracket 76a is clamped to mount support 45. The upper end of bracket 76a supports spring 74 attached to housing member 38 to urge housing member 38 to turn in a direction opposite to the pull of cable 73. The upper end of sheath 77 for cable 73 is clamped to bracket 76b by clamp 78b. Referring now to FIG. 7, the lower end of cable 73 is attached between the ends of feed back arm 71. One end of feed back arm 71 is pivotally connected to transverse member 24a. The other end of feed back arm 71 connects to split clamp member 70 through drag link 72. Clamp member 70 is attached to tie rod 21a. The lower end of sheath 77 for cable 73 is attached to transverse member 24a by clamp 78a.

It will be noted that the steering linkage 18 herein (as well as steering linkage 18b) is a conventional arrangement in which tie rod 21a, steering arms 22a and 23a, and transverse member 24a form a trapezoidal shape when road wheels 19a and 20a are directed straight ahead. When actuator 25a moves tie rod 21a as previously described, feed back arm 71 will be caused to pivot at its connection to transverse member 24a in accordance with the transverse translational movement of tie rod 21a with respect to the frame of the motor vehicle. It will be realized that this transverse translational movement of tie rod 21a is in the same direction as the translational movement of piston rod 18a. Drag link 72 is provided to allow for the additional movement of tie rod 21a towards and away from transverse member 24a. As feed back arm 71 is pivoted, cable 73 will be moved with it so that the other end of cable 73 will correspondingly turn housing member 38. Clamp member 70 can be adjustably positioned on tie rod 21a, and is preferably positioned thereon so that the turning of housing member 38 corresponds to and is aligned with the turning of road wheels 19a and 20a. Accordingly, the described coupling means connect to housing member 38 and steering linkage 18a in order to turn and align housing member 38 around mount support 45 to correspond with the turning of road wheels 19a and 20a.

Figure 8:
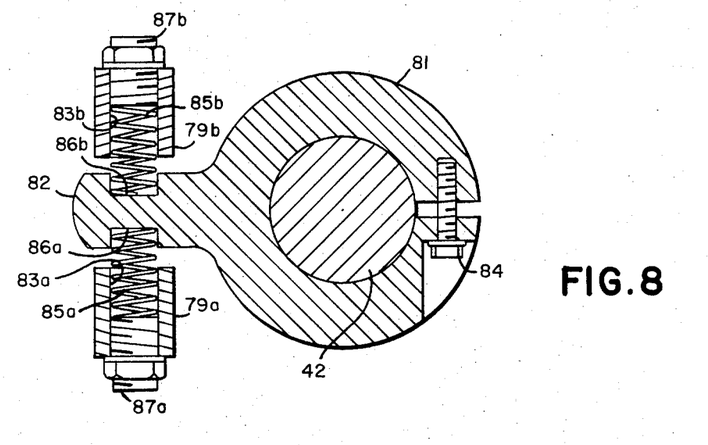
FIG. 8 is an enlarged cross-sectional view of the neutralizing spring means as seen along lines 8—8 of FIG. 3.

FIG. 8 shows an enlarged cross-sectional view of the neutralizing spring means as seen along lines 8—8 of FIG. 3. As also shown in FIG. 3, a pair of parallel support arms 79a and 79b extend upwards from housing member 38 to support a cylindrical holder 80. The neutralizing spring means connect to support arms 79a and 79b as well as to steering shaft 42. The neutralizing spring means herein includes a split collar 81 having a collar arm 82 extending in between support arms 79a and 79b. Split collar 81 is fitted around steering shaft 42. A collar bolt 84 is screwed into the ends of split collar 81 to fixedly secure split collar 81 to steering shaft 42. A first coil spring 85a is located inside bore 83a in support arm 79a with an end resting in circular inset 86a in collar arm 82. A second coil spring 85b is located inside bore 83b with an end resting in circular inset 86b in collar arm 82. Bolts 87a and 87b are adjustably threaded in bores 83a and 83b to cause springs 85a and 85b to center collar arm 82 to a neutral position. With collar arm 82 in this neutral position, steering shaft 42 will be positioned with respect to housing member 38 so that control valve 43 will be closed. The clearance between support arms 79a and 79b allows the collar arm 82 therebetween to be moved so that steering shaft 42 can be turned with respect to the position of housing member 38 against the force of springs 85a and 85b. In that event, control valve 43 will be opened so that the steering system will function to turn the road wheels in the direction of turning of steering shaft 42.

Figure 9:
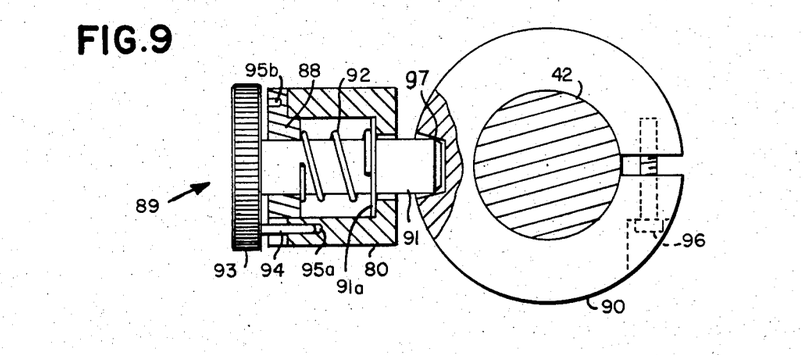
FIG. 9 is an enlarged cross-sectional view of the locking means as seen along lines 9—9 of FIG. 3.

In order to releasably secure steering shaft 42 to housing member 38 so that control valve 43 remains closed as described, a locking means is provided which includes cylindrical holder 80, a rod member 89, and a split collar 90 as seen in FIG. 9. Rod member 89 has a rod 91 extending through a spring 92 within cylinder 80. A knob 93 on one end of cylinder 80 is secured to one end of rod 91. Knob 93 has a pin 94 extending towards cylinder 80. Cylinder 80 is provided with a threadably attached spring retaining collar 88 which has a long pin hole 95a that is a little longer than pin 94, and which has a short pin hole 95b that is shorter than pin 94. Split collar 90 is fitted around steering shaft 42. A collar bolt 96 is screwed into the ends of split collar 90 to fixedly secure split collar 90 to steering shaft 42. Knob 93 can be pulled away from cylinder 80 against the force of spring 92 on flange 91a on rod 91 to allow pin 94 to clear cylinder 80. If pin 94 is allowed to enter pin hole 95a, spring 92 will force rod 91 towards split collar 90, and the free end of rod 91 will enter cutout 97 of collar 90 to prevent steering shaft 42 from being turned with respect to housing member 38. Steering shaft 42 will now be positioned with respect to housing member 38 so that control valve 43 is closed. If knob 93 is pulled away from cylinder 80, and pin 94 is allowed to enter short pin hole 95b, then the free end of rod member 91 will be positioned outside of cutout 97 of collar 90 and be clear of collar 90. In this case, steering shaft 42 can be turned with respect to housing member 38.

The operation of the steering system of this invention for steering road wheels 19a and 20a will now be considered. When the described steering system does not change the direction of turning of road wheels 19a and 20a, control valve 43 is closed and will not operate. Cable 73 of said coupling means will have correspondingly positioned housing member 38 in accordance with the position of tie rod 21a. Steering shaft 42 will then be turned with respect to housing member 38 wherein its control arm 49 has positioned valve spool or movable member 59 inside control valve 43 as seen in FIG. 6 to close control valve 43. Fluid under high pressure from pump 32 being inside circumferential recess 61 will not be able to enter either connecting passageway 66a or 66b. As both connecting passageways 66a and 66b as well as both sides of piston 27a in actuator 25a will have fluid under low pressure, piston 27a will not move. With no turning force being applied to turning member 17a, the neutralizing spring means will hold collar arm 82 in its centralized position. Steering shaft 42 with its control arm 49 will remain positioned with respect to housing member 38 wherein control valve 43 is closed.

When turning member 17a is manually turned, steering shaft 42 will be turned with respect to housing member 38. Collar arm 82 will then be moved away from its centralized neutral position against the forces of springs 85a and 85b. If the driver turns turning member 17a clockwise, then control arm 49 will be moved to the right as seen in FIG. 6 to allow fluid under high pressure in circumferential recess 61 to flow through transverse passageway 41 into conduit 37a and into the chamber above piston 27a in actuator 25a. Fluid under low pressure under piston 27a in actuator 25a will be conducted by conduit 36a through transverse passageway 40 into circumferential recess 60 then back to pump reservoir 33. Thus the high hydraulic pressure developed by pump 32 is applied to the upper side of piston 27a in actuator 25a. Piston 27a will be forced down, and piston rod 28a will push extension section 29a to correspondingly move tie rod 21a. As a result, steering arms 22a and 23a will turn road wheels 19a and 20a to the right.

If the driver turns turning member 17a counterclockwise, then control arm 49 will be moved to the left as seen in FIG. 6 to allow fluid under high pressure in circumferential recess 61 to flow through transverse passageway 40 into conduit 36a and into the chamber below piston 27a. Fluid under low pressure over piston 27a in actuator 25a will be conducted by conduit 37a through transverse passageway 41 into chamber 53 then back to fluid reservoir 33. Thus the high hydraulic pressure developed by pump 32 is applied to the lower side of piston 27a in actuator 25a. Piston 27a will be forced up, and piston rod 28a will push extension section 29a to move tie rod 21a. As a result, steering arms 22a and 23a will turn road wheels 19a and 20a to the left.

As tie rod 21a is moved, cable 73 will turn housing member 38 with respect to steering shaft 42 in a direction to close control valve 43 as previously described. In other words, housing member 38 will be turned by cable 73 in a direction in order to return the steering system to its neutralized condition. If the manual force on turning member 17a is continued, then the steering system will continue to operate to continue to turn road wheels 19a and 20a. If the manual force on turning member 17a is removed, then the neutralizing spring means of FIG. 8 will cause the steering system to return to its neutralized condition, and the turning of road wheels 19a and 20a will stop. By suitably positioning clamp member 70 on tie rod 21a, the turned direction of lever 17a can be made to be the same as the turned direction of road wheels 19a and 20a.

Figure 10:
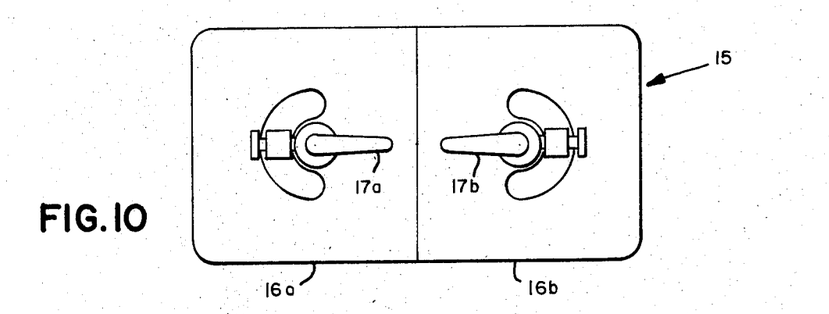
FIG. 10 is an enlarged top view of the steering console as seen along lines 10—10 of FIG. 1.
Figure 11:
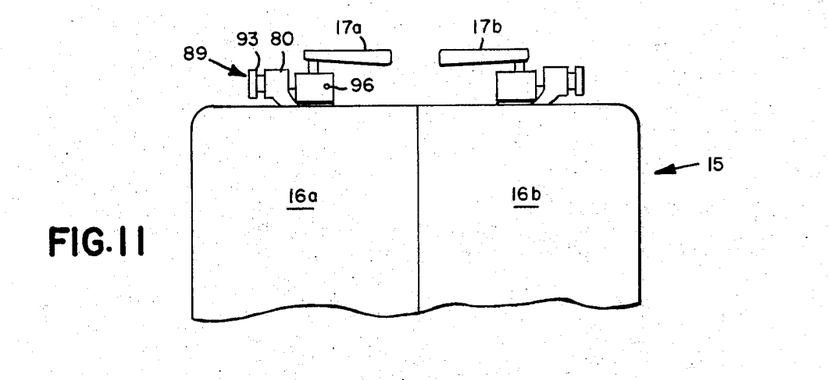
FIG. 11 is a side view of the steering console shown in FIG. 10.

As indicated, the steering system for road wheels 19b and 20b operate in the same manner as that for front road wheels 19a and 20a. For such a motor vehicle with two pair of steerable road wheels, its steering units 16a and 16b are preferably positioned as indicated in FIGS. 1 and 2. In that event, the steering shafts of steering units 16a and 16b will be in parallel and positioned so that its turning levers 17a and 17b are close to each other as seen in FIGS. 10 and 11. Being so closely positioned, levers 17a and 17b can be simultaneously manually operated by one hand of the driver of the motor vehicle. Accordingly, the driver of the motor vehicle will be able to easily determine and control the turned direction of both pairs of road wheels.

In the above illustrated and described embodiment of a directly controlled hydraulic steering system of this invention, its steering power source was pressure fluid source 31 including an hydraulic pump 32 with a reservoir 33 of hydraulic fluid, and its control means was a control valve 43 to selectively open and close the hydraulic connection between pressure fluid source 31 and hydraulically operated actuators 25a and 25b. It will be obvious to experts skilled in the art that several modifications and variations may be made that come within the scope of the present invention. For example, if it is desirable to incorporate in motor vehicles an hydraulically amplified control means of hydraulic steering power, suitable hydraulic circuits may be added between control valve 43 and actuators 25a and 25b. In the case where it is desired to utilize electrical control of hydraulic steering power, the control means herein may be an electrically operated solenoid valve. In the case where it is desired to utilize electrical control of electrical steering power, electrically operated actuators would also be substituted for actuators 25a and 25b, and its steering power source may be derived from the electrical system of the motor vehicle. In any event, it will be realized that such modifications and variations for differently operated steering systems can be made without departing from the concept and spirit of the present invention.

Having herein described the invention, what is claimed as new is:

1. A steering system for a motor vehicle having a steering linkage to simultaneously turn a pair of steerable road wheels, a hydraulically operated actuator to move the steering linkage, and a pressure fluid source, said steering system comprising:
    a steering shaft with a laterally extending control arm;
    a housing member surrounding the steering shaft;
    coupling means connected to the housing member and to the steering linkage in order to turn and align the housing member around the steering shaft to correspond with the turning of the road wheels;
    a control valve mounted on the housing member to move therewith, said control valve being hydraulically connected to the pressure fluid source and to the actuator, and said control valve having a movable member therein to be selectively positionable by the control arm of the steering shaft to operate the control valve;
    spring means connected to urge the steering shaft and its control arm to move the movable member of the control valve to close the hydraulic connection between the pressure fluid source and the actuator; and
    a turning member connected to the steering shaft to enable the steering shaft to be turned against the force of the spring means in order to operate the control valve to hydraulically connect the actuator with the pressure fluid source.

2. The steering system in accordance with claim 1 in which
    said steering linkage includes a transverse member attached to the motor vehicle, a tie rod, and a steering arm at each end of the tie rod being pivotally connected to the tie rod and transverse member to turn each road wheel; and in which
    said coupling means includes a clamp member fixedly connected to said tie rod, a feed back arm pivotally connected to the transverse member, a drag link connected between the clamp member and the feed back arm to pivot the feed back arm in accordance with the translational movement of the tie rod, a spring member connected to the housing member to urge it to rotate in one direction, and a cable connected to the feed back arm and to the housing member to turn the housing member against the force of the spring member.

3. The steering system in accordance with claim 2 in which said housing member has a pair of passageways therethrough connected to the hydraulically operated actuator, and said control valve being connected to the actuator by the passageways so that its movable member can selectively direct the pressure fluid from the pressure fluid source through one or the other passageway to operate the actuator to move the steering linkage in opposite directions respectively.

4. The steering system in accordance with claim 3 which additionally includes locking means attached to the housing member to releasably secure the steering shaft to the housing member in order to maintain the movable member of the control valve in its closed position, and wherein the turning member is a lever attached to turn the steering shaft with respect to the housing member against the force of the spring means.

5. A steering system for a motor vehicle comprising:

a steering linkage to simultaneously turn a pair of steerable road wheels;
a hydraulically operated actuator to move the steering linkage;
a pressure fluid source;
a steering shaft with a laterally extending control arm;
a rotatable housing member surrounding the steering shaft;
coupling means connected to the housing member and to the steering linkage in order to turn and align the housing member around the steering shaft to correspond with the turning of the road wheels;

a control valve mounted on the housing member to move therewith, said control valve being hydraulically connected to the pressure fluid source and to the actuator, and said control valve having a movable member being selectively positionable by the control arm of the steering shaft in order to operate the control valve;
spring means connected to urge the steering shaft and its control arm to move the movable member to close the control valve; and
a turning member connected to the steering shaft to enable the steering shaft to be turned against the force of the spring means in order to operate the control valve to hydraulically connect the actuator with the pressure fluid source.

6. The steering system in accordance with claim 5 in which said coupling means includes a feed back arm pivotally connected to the steering linkage, a spring member connected to the housing member to urge it to rotate in one direction, and a cable connected to the feed back arm and to the housing member to turn the housing member against the force of the spring member.

7. The steering system in accordance with claim 6 in which said housing member has a pair of passageways therethrough connected to the hydraulically operated actuator, and said control valve being connected to the actuator by the passageways so that its movable member can selectively direct the pressure fluid from the pressure fluid source through one or the other passageway to operate the actuator to move the steering linkage in opposite directions respectively.

8. The steering system in accordance with claim 7 which additionally includes locking means attached to the housing member to releasably secure the steering shaft to the housing member in order to maintain the movable member of the control valve in its closed position; and wherein the turning member is a lever attached to turn the steering shaft with respect to the housing member against the force of the spring means.

9. In a motor vehicle with two pairs of steerable road wheels, a steering linkage to simultaneously turn each pair of steerable road wheels, a hydraulically operated actuator to move each steering linkage, and a pressure fluid source, a steering system for each pair of road wheels comprising:

a steering shaft with an extending control arm;
a rotatable housing member surrounding the steering shaft;
coupling means connected to the housing member and to the steering linkage in order to turn the housing member to correspond with the turning of the road wheels;
a control valve mounted on the housing member to move therewith, said control valve being hydraulically connected to the pressure fluid source and to the actuator, and said control valve having a movable member therein to be selectively positionable by the control arm of the steering shaft to operate the control valve;
spring means connected to urge the steering shaft and its control arm to move the movable member of the control valve to close the hydraulic connection between the pressure fluid source and the actuator; and
a turning member connected to each steering shaft to enable said steering shaft to be turned against the force of the spring means in order to operate the control valve to hydraulically connect said actuator with the pressure fluid source.

10. The steering system in accordance with claim 9 in which each coupling means includes a feed back arm pivotally connected to the steering linkage, a spring member connected to the housing member to urge it to rotate in one direction, and a cable connected to the feed back arm and to the housing member to turn the housing member against the force of the spring member.

11. The steering system in accordance with claim 10 in which each housing member has a pair of passageways therethrough connected to the hydraulically operated actuator, and said control valve being connected to the actuator by the passageways so that its movable member can selectively direct the pressure fluid from the pressure fluid source through one or the other passageway to operate the actuator to move the steering linkage in opposite directions respectively.

12. The steering system in accordance with claim 11 which additionally includes locking means attached to the housing member to releasably secure the steering shaft to the housing member in order to maintain the movable member of the control valve in its closed position; and wherein the turning member is a lever attached to each steering shaft to turn the steering shaft with respect to the housing member against the force of the spring means, and the steering shafts are arranged in parallel and positioned so that both levers are close to each other to be simultaneously manually operable by one hand of a driver of the motor vehicle.

13. A steering system for a motor vehicle comprising:

a steering linkage to simultaneously turn a pair of steerable road wheels;
a hydraulically operated actuator to move the steering linkage to turn the road wheels in either direction;
a pressure fluid source;
a rotatable housing member having a shaft bore;
a mount support;
a steering shaft extending into the shaft bore of the housing member to be rotatively supported thereby;

coupling means connected to the housing member and to the steering linkage in order to turn and align the housing member to correspond with the turning of the road wheels;

a control valve mounted on the housing member to move therewith, said control valve being hydraulically connected to the pressure fluid source and to the actuator, and said control valve having a movable member being selectively positionable therein to operate the control valve;

a control arm connected to the steering shaft to turn therewith and to move the movable member to operate the control valve to hydraulically connect the actuator with the pressure fluid source in order to turn the wheels in a direction in accordance with the turning of the steering shaft;

neutralizing spring means connected to urge the steering shaft and the control arm to move the movable member of the control valve to close the hydraulic connection between the pressure fluid source and the actuator; and a turning member connected to the steering shaft to enable the steering shaft to be turned against the force of the neutralizing spring means in order to operate the control valve to hydraulically connect the actuator with the pressure fluid source.

14. The steering system in accordance with claim 13 in which said steering linkage includes a transverse member attached to the motor vehicle, a tie rod, and a steering arm at each end of the tie rod being pivotally connected to the tie rod and to the transverse member to turn each road wheel; and in which said coupling means includes a clamp member fixedly connected to said tie rod, a feed back arm pivotally connected to the transverse member, a drag link connected between the clamp member and the feed back arm to pivot the feed back arm in accordance with the translational movement of the tie rod, a spring member connected to the housing member to urge it to rotate in one direction, and a cable connected to the feed back arm and to the housing member to turn the housing member against the force of the spring member.

15. The steering system in accordance with claim 14 in which said housing member has a pair of passageways therethrough connected to the hydraulically operated actuator, and said control valve being connected to the actuator by the passageways so that its movable member can selectively direct the pressure fluid from the pressure fluid source through one or the other passageway to operate the actuator to move the steering linkage in opposite directions respectively.

16. The steering system in accordance with claim 15 which additionally includes locking means attached to the housing member to releasably secure the steering shaft to the housing member in order to maintain the movable member of the control valve in its closed position, and wherein the turning member is a lever attached to turn the steering shaft with respect to the housing member against the force of the spring means.

17. In a motor vehicle with two pairs of steerable road wheels, a steering linkage to simultaneously turn each pair of steerable road wheels, and a pressure fluid source, a steering system for each pair of road wheels comprising:

a rotatable housing member having a shaft bore;
a mount support;
a steering shaft extending into the shaft bore of the housing member to be rotatively supported thereby coupling means connected to the housing member and to the steering linkage in order to turn and align the housing member to correspond with the turning of the road wheels;

an actuator being hydraulically operable to move the steering linkage to turn the road wheels in either direction;

a control valve mounted on the housing member to move therewith, said control valve being hydraulically connected to the pressure fluid source and to the actuator, and said control valve having a movable member being selectively positionable therein to operate the control valve;

a control arm connected to the steering shaft to turn therewith and to move the movable member to operate the control valve to hydraulically connect the actuator with the pressure fluid source in order to turn the wheels in a direction in accordance with the turning of the steering shaft;

spring means connected to urge the steering shaft and the control arm to move the movable member of the control valve to close the hydraulic connection between the pressure fluid source and the actuator; and a turning member connected to the steering shaft to enable the steering shaft to be turned against the force of the spring means in order to operate the control valve to connect the actuator with the pressure fluid source.

18. The steering system in accordance with claim 17 in which each coupling means includes a feed back arm pivotally connected to the steering linkage, a spring member connected to the housing member to urge it to rotate in one direction, and a cable connected to the feed back arm and to the housing member to turn the housing member against the force of the spring member.

19. The steering system in accordance with claim 18 in which each housing member has a pair of passageways therethrough connected to the hydraulically operated actuator, and said control valve being connected to the actuator by the passageways so that its movable member can selectively direct the pressure fluid from the pressure fluid source through one or the other passageway to operate the actuator to move the steering linkage in opposite directions respectively.

20. The steering system in accordance with claim 19 which additionally includes locking means attached to the housing member to releasably secure the steering shaft to the housing member in order to maintain the movable member of the control valve in its closed position; and wherein the turning member is a lever attached to each steering shaft to turn the steering shaft with respect to the housing member against the force of the spring means, and the steering shafts are arranged in parallel and positioned so that both levers are close to each other to be simultaneously manually operable by one hand of a driver of the motor vehicle.

21. A steering system for a motor vehicle having a steering linkage to simultaneously turn a pair of steerable road wheels, an actuator to move the steering linkage, and a steering power source, said steering system comprising:

a steering shaft with a laterally extending control arm;

a housing member surrounding the steering shaft;

coupling means connected to the housing member and to the steering linkage in order to turn and align the housing member to correspond with the turning of the road wheels;

a control means mounted on the housing member to move therewith, said control means being connected to the steering power source and to the actuator, and said control means having a movable member therein to be selectively positionable by the control arm of the steering shaft to operate the control means;

spring means connected to urge the steering shaft and its control arm to move the movable member of the control means to disconnect the connection between the steering power source and the actuator; and a turning member connected to the steering shaft to enable the steering shaft to be turned against the force of the spring means in order to operate the control means to connect the actuator with the steering power source.

22. The steering system in accordance with claim 21 in which said steering linkage includes a transverse member attached to the motor vehicle, a tie rod, and a steering arm at each end of the tie rod being pivotally connected to the tie rod and transverse member to turn each road wheel; and in which said coupling means includes a clamp member fixedly connected to said tie rod, a feed back arm pivotally connected to the transverse member, a drag link connected between the clamp member and the feed back arm to pivot the feed back arm in accordance with the translational movement of the tie rod, a spring member connected to the housing member to urge it to rotate in one direction, and a cable connected to the feed back arm and to the housing member to turn the housing member against the force of the spring member.

23. The steering system in accordance with claim 22 which additionally includes locking means attached to the housing member to releasably secure the steering shaft to the housing member in order to maintain the movable member of the control means in its inoperative position, and wherein the turning member is a lever attached to turn the steering shaft with respect to the housing member against the force of the spring means.

24. In a motor vehicle with two pairs of steerable road wheels, a steering linkage to simultaneously turn each pair of steerable road wheels, and a steering power source, a steering system for each pair of road wheels comprising:

a rotatable housing member having a shaft bore;

a mount support to rotatively support the housing member;

a steering shaft extending into the shaft bore of the housing member to be rotatively supported thereby;

coupling means connected to the housing member and to the steering linkage in order to turn and align the housing member to correspond with the turning of the road wheels;

an actuator being operable to move the steering linkage to turn the road wheels in either direction;

a control means mounted on the housing member to move therewith, said control means being connected to the steering power source and to the actuator, and said control means having a movable member being selectively positionable therein to operate the control means;

a control arm connected to the steering shaft to turn therewith and to move the movable member to operate the control means to connect the actuator with the steering power source in order to turn the wheels in a direction in accordance with the turning of the steering shaft;

spring means connected to urge the steering shaft and the control arm to move the movable member of the control means to disconnect the connection between the steering power source and the actuator; and a turning member connected to the steering shaft to enable the steering shaft to be turned against the force of the spring means in order to operate the control means to connect the actuator with the steering power source.

25. The steering system in accordance with claim 24 in which each coupling means includes a feed back arm pivotally connected to the steering linkage, a spring member connected to the housing member to urge it to rotate in one direction, and a cable connected to the feed back arm and to the housing member to turn the housing member against the force of the spring member.

26. The steering system in accordance with claim 25 which additionally includes locking means attached to the housing member to releasably secure the steering shaft to the housing member in order to maintain the movable member of the control means in its inoperative position; and wherein the turning member is a lever attached to each steering shaft to turn the steering shaft with respect to the housing member against the force of the spring means, and the steering shafts are arranged in parallel and positioned so that both levers are close to each other to be simultaneously manually operable by one hand of a driver of the motor vehicle.

* * * * *